United States Patent
Itoh

(10) Patent No.: US 10,875,415 B2
(45) Date of Patent: Dec. 29, 2020

(54) METHOD OF CHARGING ELECTRIC AUTONOMOUS MOVING BODY

(71) Applicant: Toyota Jidosha Kabushiki Kaisha, Toyota (JP)

(72) Inventor: Masayuki Itoh, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 118 days.

(21) Appl. No.: 16/234,828

(22) Filed: Dec. 28, 2018

(65) Prior Publication Data
US 2019/0232812 A1  Aug. 1, 2019

(30) Foreign Application Priority Data
Jan. 26, 2018  (JP) ................................ 2018-011916

(51) Int. Cl.
*B60L 53/35* (2019.01)
*B60L 53/30* (2019.01)
*B60L 53/34* (2019.01)
*B60L 53/66* (2019.01)
*B60L 53/16* (2019.01)

(52) U.S. Cl.
CPC ............... *B60L 53/35* (2019.02); *B60L 53/16* (2019.02); *B60L 53/30* (2019.02); *B60L 53/34* (2019.02); *B60L 53/66* (2019.02)

(58) Field of Classification Search
CPC ....................................................... B60L 53/35
USPC ........................................................ 320/109
See application file for complete search history.

(56) References Cited

U.S. PATENT DOCUMENTS

| 6,087,806 A | * | 7/2000 | Fujioka | B60L 15/32 320/109 |
| 10,108,202 B1 | * | 10/2018 | Aikin | G05D 1/0293 |
| 2019/0061542 A1 | * | 2/2019 | Zhao | B60L 53/16 |

FOREIGN PATENT DOCUMENTS

JP  2005198397 A  7/2005

* cited by examiner

*Primary Examiner* — Edward Tso
*Assistant Examiner* — Ahmed H Omar
(74) *Attorney, Agent, or Firm* — Dinsmore & Shohl LLP

(57) ABSTRACT

When batteries of a plurality of electric autonomous moving bodies are charged, a plurality of electric autonomous moving bodies are aligned in a serial state, a second connection means of one of the electric autonomous moving bodies that are adjacent to each other in a direction in which the electric autonomous moving bodies are aligned and a first connection means of the other one of the electric autonomous moving bodies that are adjacent to each other are electrically connected to each other, and the first connection means of the electric autonomous moving body that is the closest to the charger unit and the connection means of the charger unit are electrically connected to each other. In this case, power is supplied from the charger unit to each of the electric autonomous moving bodies, thereby charging the batteries of the plurality of electric autonomous moving bodies.

4 Claims, 16 Drawing Sheets

METHOD OF CHARGING ELECTRIC AUTONOMOUS MOVING BODY

CROSS REFERENCE TO RELATED APPLICATIONS

This application is based upon and claims the benefit of priority from Japanese patent application No. 2018-011916, filed on Jan. 26, 2018, the disclosure of which is incorporated herein in its entirety by reference.

BACKGROUND

The present disclosure relates to a method of charging an electric autonomous moving body.

In recent years, techniques for charging batteries of electric autonomous moving bodies such as robots (personal mobility robots, cleaning robots etc.) or electric automobiles have been proposed.

For example, Japanese Unexamined Patent Application Publication No. 2005-198397 discloses a technique for charging a battery of an electric vehicle. According to the technique disclosed in Japanese Unexamined Patent Application Publication No. 2005-198397, a plurality of charger units are aligned in parallel in order to charge batteries of a plurality of electric vehicles at one time and one electric vehicle is electrically connected to one charger unit. In this way, the batteries of the plurality of electric vehicles are charged in the state in which the plurality of electric vehicles are aligned in parallel.

SUMMARY

In the technique disclosed in Japanese Unexamined Patent Application Publication No. 2005-198397, however, since it is required to allocate one electric vehicle to one charger unit, a plurality of charger units need to be provided in order to charge the batteries of a plurality of electric vehicles concurrently. Therefore, there are problems that an initial investment cost for charging equipment increases, a running cost for managing the plurality of charger units increases, etc.

Further, in the technique disclosed in Japanese Unexamined Patent Application Publication No. 2005-198397, a plurality of charger units are arranged in parallel. Therefore, it is required to increase the intervals between the electric vehicles or to make space for the electric vehicles to pass, which causes a problem that the size of a parking space for the electric vehicles increases.

The present disclosure has been made in view of the aforementioned problems and provides a method of charging an electric autonomous moving body capable of reducing the cost required for the charger unit and eliminating the need for a large parking space.

A method of charging an electric autonomous moving body according to one aspect of the present disclosure is a method of charging batteries of a plurality of electric autonomous moving bodies, in which one charger unit capable of charging the batteries of the plurality of electric autonomous moving bodies is prepared, connection means that can be electrically connected to the electric autonomous moving body is provided in the charger unit, each of the electric autonomous moving bodies is provided with a first connection means that can be electrically connected to the connection means of the charger unit and further provided with a second connection means that can be electrically connected to the first connection means of another one of the electric autonomous moving bodies in a position that is opposite to the body of the electric autonomous moving body with respect to the first connection means in a direction in which the electric autonomous moving bodies are aligned in a serial state, and the plurality of electric autonomous moving bodies are aligned in the serial state, the second connection means of one of the electric autonomous moving bodies that are adjacent to each other in the direction in which the electric autonomous moving bodies are aligned and the first connection means of the other one of the electric autonomous moving bodies that are adjacent to each other are electrically connected to each other, and the first connection means of the electric autonomous moving body that is the closest to the charger unit and the connection means of the charger unit are electrically connected to each other and power is supplied from the charger unit to each of the electric autonomous moving bodies, thereby charging the batteries of the plurality of electric autonomous moving bodies.

According to the aspect of the present disclosure described above, it is possible to provide a method of charging an electric autonomous moving body capable of reducing the cost required for the charger unit and eliminating the need for a large parking space.

The above and other objects, features and advantages of the present disclosure will become more fully understood from the detailed description given hereinbelow and the accompanying drawings which are given by way of illustration only, and thus are not to be considered as limiting the present disclosure.

DETAILED DESCRIPTION

Hereinafter, with reference to the drawings, embodiments of the present disclosure will be explained. Throughout the drawings that will be described below, the same or corresponding components are denoted by the same reference symbols and overlapping descriptions will be omitted as necessary.

(1) First Embodiment

<Configuration of First Embodiment>
<External Configuration of Charging System According to First Embodiment>

First, an external configuration of a charging system according to a first embodiment will be explained.

Figure 1:
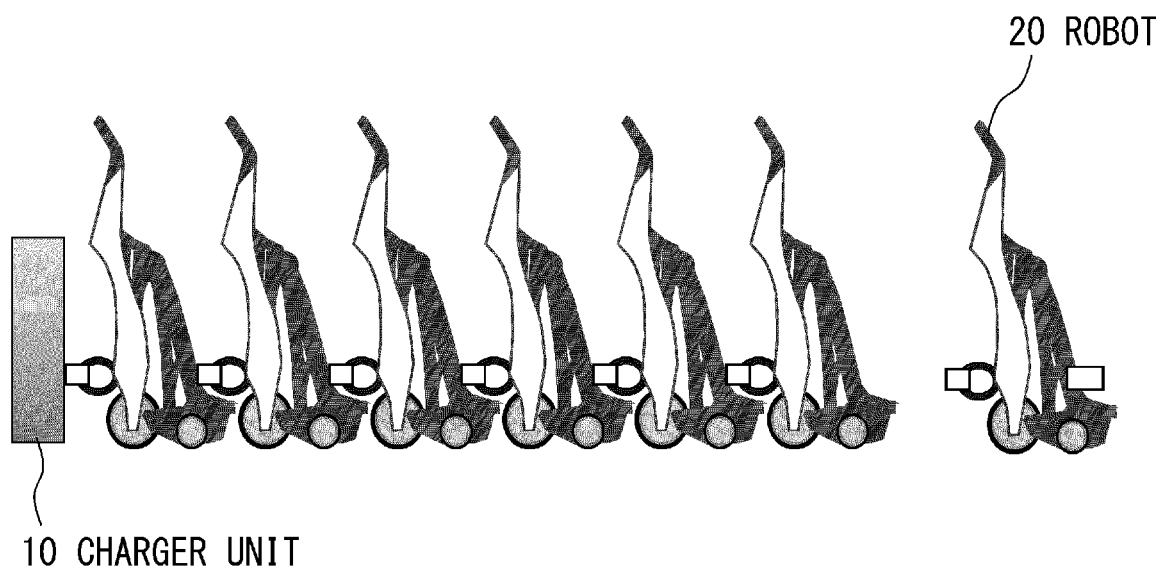
FIG. 1 is an external side view showing one example of an external configuration of a charging system according to a first embodiment.

FIG. 1 shows one example of the external configuration of the charging system according to the first embodiment. FIG. 1 shows an example in which an electric autonomous moving body is a robot (personal mobility robot) on which a user rides when traveling. However, the electric autonomous moving body according to the present disclosure is not limited to the robot shown in FIG. 1.

As shown in FIG. 1, in the charging system according to the first embodiment, one charger unit 10 that can charge batteries 205 (see FIG. 7 described later) of a plurality of robots 20 is provided for the plurality of robots 20 including the batteries 205.

When the batteries 205 of the plurality of robots 20 are charged, the plurality of robots 20 are aligned in a serial state and the plurality of robots 20 are electrically connected with one another, and the robot 20 that is the closest to the charger unit 10 is electrically connected to the charger unit 10. Then power is supplied from the charger unit 10 to each of the robots 20 via the other robots 20 and the batteries 205 of the plurality of robots 20 are thus charged. Therefore, the robot 20 that is the closest to the charger unit 10 is supplied with power from the charger unit 10 directly and the other robots 20 are supplied with power from the charger unit 10 indirectly.

<External Configurations of Charger Unit and Robot According to First Embodiment>

Next, detailed external configurations of the charger unit 10 and the robot 20 according to the first embodiment will be explained.

Figure 2:
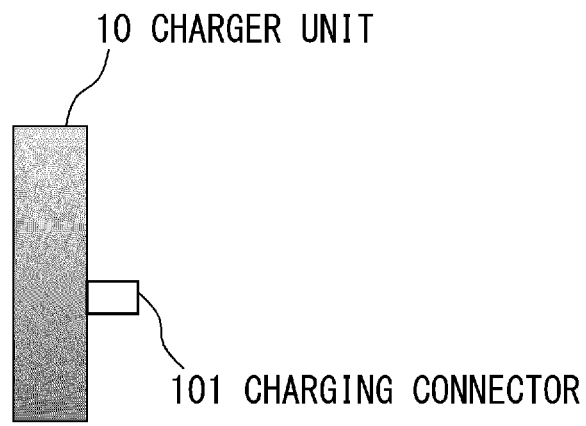
FIG. 2 is an external side view showing one example of an external configuration of a charger unit according to the first embodiment.
Figure 3:
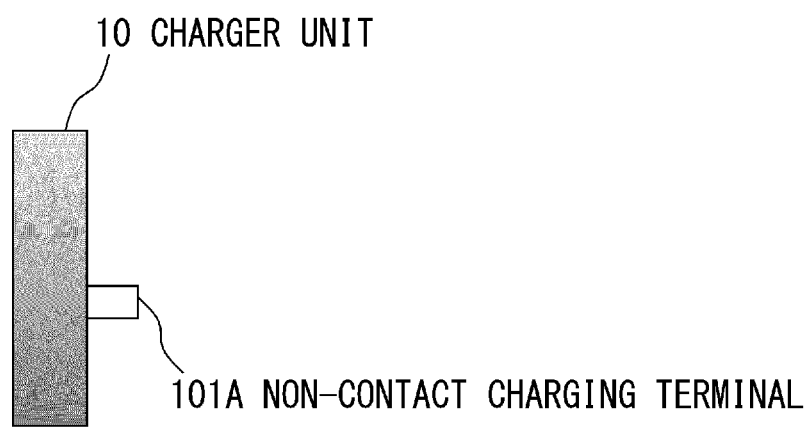
FIG. 3 is an external side view showing another example of the external configuration of the charger unit according to the first embodiment.

FIGS. 2 and 3 each show one example of the external configuration of the charger unit 10 according to the first embodiment.

The charger unit 10 includes one of a charging connector 101 shown in FIG. 2 and a non-contact charging terminal 101A shown in FIG. 3. The charging connector 101 and the non-contact charging terminal 101A are examples of connection means.

The charging connector 101 is a connector that can engage with a forward charging connector 201 (described later) of the robot 20 and can be electrically connected thereto in order to supply power to the robot 20. The non-contact charging terminal 101A is a terminal that can be electrically connected to a forward non-contact charging terminal 201A (described later) of the robot 20 in a state in which the non-contact charging terminal 101A does not contact the forward non-contact charging terminal 201A in such a way that the non-contact charging terminal 101A is able to supply power to the robot 20.

Figure 4:
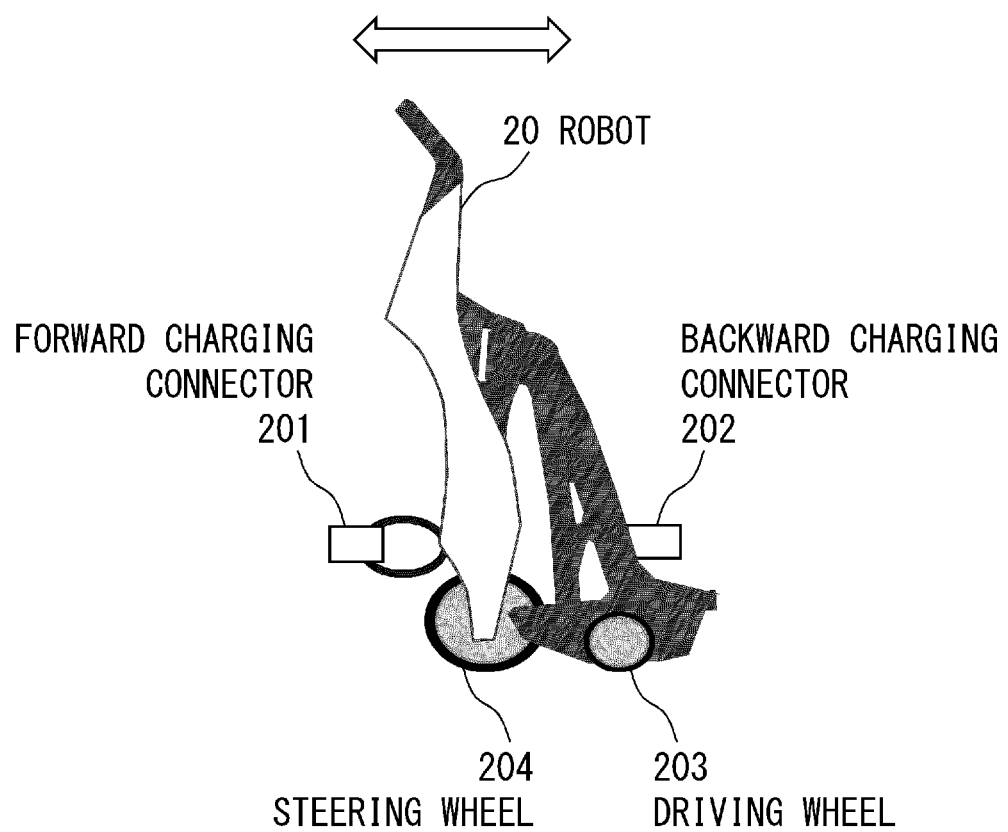
FIG. 4 is an external side view showing one example of an external configuration of a robot according to the first embodiment.
Figure 5:
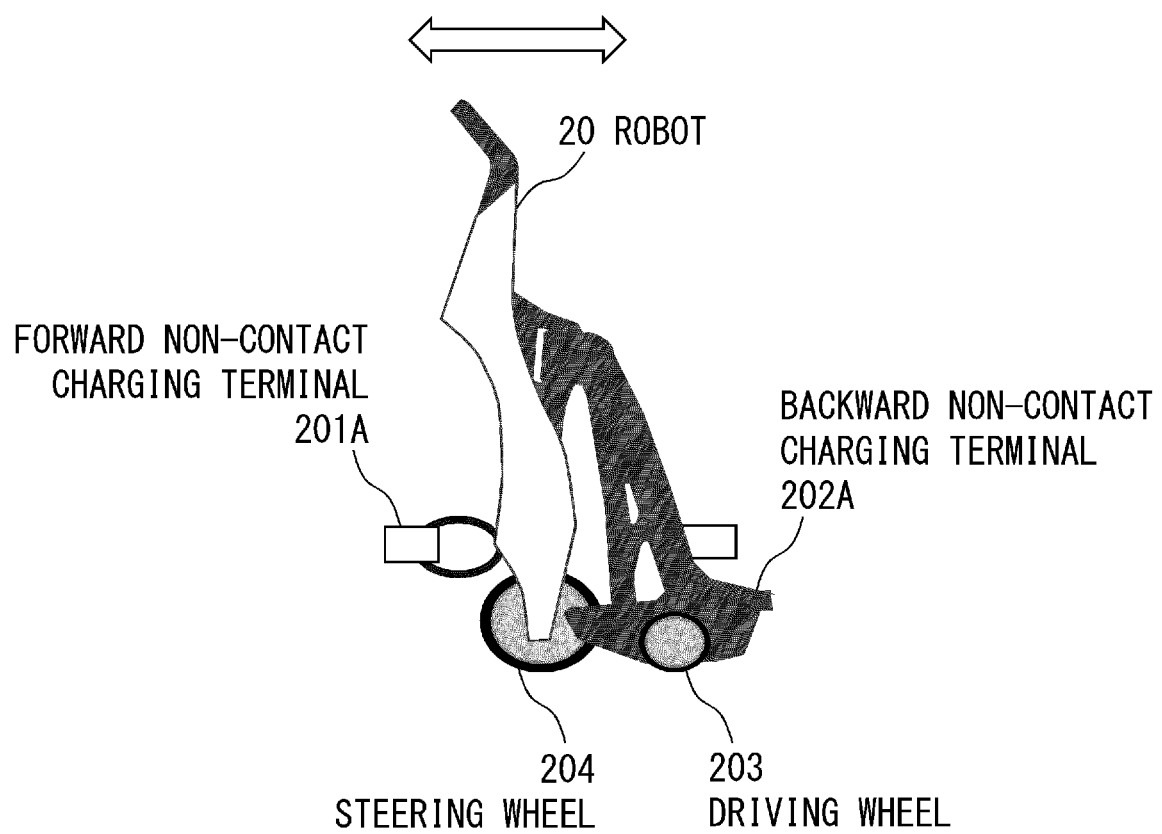
FIG. 5 is an external side view showing another example of the external configuration of the robot according to the first embodiment.

FIGS. 4 and 5 each show one example of the external configuration of the robot 20 according to the first embodiment.

The robot 20 includes driving wheels 203 and a steering wheel 204, and is a personal mobility robot on which a user rides when traveling. Further, the robot 20 includes the forward charging connector 201 and a backward charging connector 202 shown in FIG. 4 or the forward non-contact charging terminal 201A and a backward non-contact charging terminal 202A shown in FIG. 5. The forward charging connector 201 and the forward non-contact charging terminal 201A are examples of first connection means and the backward charging connector 202 and the backward non-contact charging terminal 202A are examples of second connection means.

The forward charging connector 201 is a connector that is provided in the front of the body of the robot 20 and can engage with the charging connector 101 of the charger unit 10 and can be electrically connected thereto in order to input the power supplied from the charger unit 10 directly or indirectly. The forward non-contact charging terminal 201A is a terminal that is provided in the front of the body of the robot 20 and can be electrically connected to the non-contact charging terminal 101A of the charger unit 10 in a state in which they do not contact each other in order to input the power supplied from the charger unit 10 directly or indirectly.

The backward charging connector 202 is a connector that is provided in the rear of the body of the robot 20 and can engage with the forward charging connector 201 of another robot 20 and can be electrically connected thereto in order to output power to the other robot 20. The backward non-contact charging terminal 202A is a terminal that is provided in the rear of the body of the robot 20 and can be electrically connected to the forward non-contact charging terminal 201A of another robot 20 in a state in which they do not contact each other in order to output power to the other robot 20.

It is sufficient that one of the charging connector 101 and the forward charging connector 201 be a male connector and the other one of them be a female connector, and it does not matter which one of them is the male or the female connector. It is also sufficient that one of the forward charging connector 201 and the backward charging connector 202 be a male connector and the other one of them be a female connector, and it does not matter which one of them is the male or the female connector.

Further, while the charging connector 101, the forward charging connector 201, and the backward charging connector 202 include at least wires for supplying power, they may include wires or the like for detecting the electrical connection as necessary.

Further, when the connectors (the charging connector 101, the forward charging connector 201, and the backward charging connector 202) are used, the robots 20 need to be parked within a positional displacement allowance of the connectors. Therefore, from the viewpoint of reducing the positional displacement, it is more advantageous to use the non-contact charging terminals (the non-contact charging terminal 101A, the forward non-contact charging terminal 201A, and the backward non-contact charging terminal 202A). On the other hand, when the non-contact charging terminals are used, the number of electronic circuits increases and the cost increases. Therefore, from the viewpoint of reducing the cost, it is more advantageous to use the connectors. Therefore, which one of the connectors and the non-contact charging terminals should be used may be determined as appropriate depending on which one of the positional displacement and the cost should be prioritized.

In the first embodiment, the direction in which the robots 20 are aligned when the plurality of robots 20 are aligned in the serial state is set as the front-back direction of the robot 20, the forward charging connector 201 or the forward non-contact charging terminal 201A is arranged in the front of the body of the robot 20, and the backward charging connector 202 or the backward non-contact charging terminal 202A is arranged in the rear of the body of the robot 20. However, the present disclosure is not limited thereto. The direction in which the robots 20 are aligned may be a direction other than the front-back direction of the robot 20 (e.g., a direction that is tilted from the front-back direction, a lateral direction or the like). In this case, it is sufficient that the charging connector or the non-contact charging terminal on the output side be arranged in a position that is opposite to the body of the robot 20 with respect to the charging connector or the non-contact charging terminal on the input side in the direction in which the robots 20 are aligned.

<Block Configurations of Charger Unit and Robot According to First Embodiment>

Next, block configurations of the charger unit 10 and the robot 20 according to the first embodiment will be explained. In this example, block configurations in a case in which the charger unit 10 includes the charging connector 101 and the robot 20 includes the forward charging connector 201 and the backward charging connector 202 will be explained.

Figure 6:
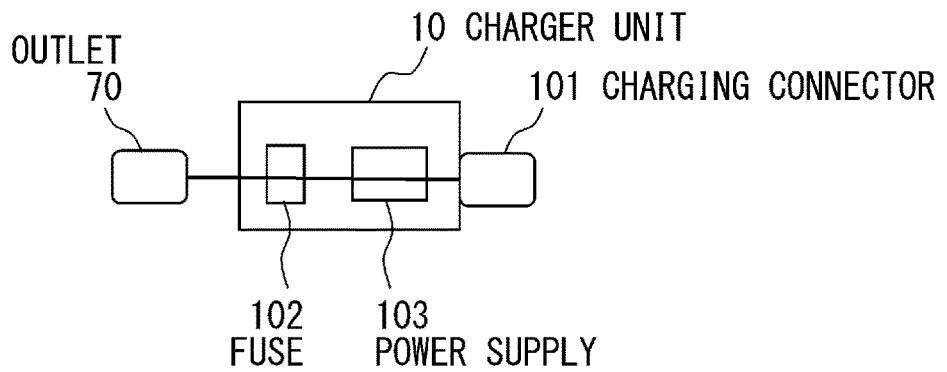
FIG. 6 is a block diagram showing one example of a block configuration of the charger unit according to the first embodiment.

FIG. 6 shows one example of a block configuration of the charger unit 10 according to the first embodiment.

The charger unit 10 shown in FIG. 6 includes, besides the aforementioned charging connector 101, a fuse 102 and a power supply 103.

The power supply 103 receives power from a commercial power supply (not shown) via an outlet 70 and supplies power to the robot 20 electrically connected to the charging connector 101. The robot 20 is supplied with various types of power depending on direct current, alternating current, a voltage capacity, and a current capacity etc.

The fuse 102 is arranged between the outlet 70 and the power supply 103. When the power is supplied from the outlet 70 to the power supply 103, the fuse 102 blows if an overcurrent flows, thereby protecting the power supply 103.

Figure 7:
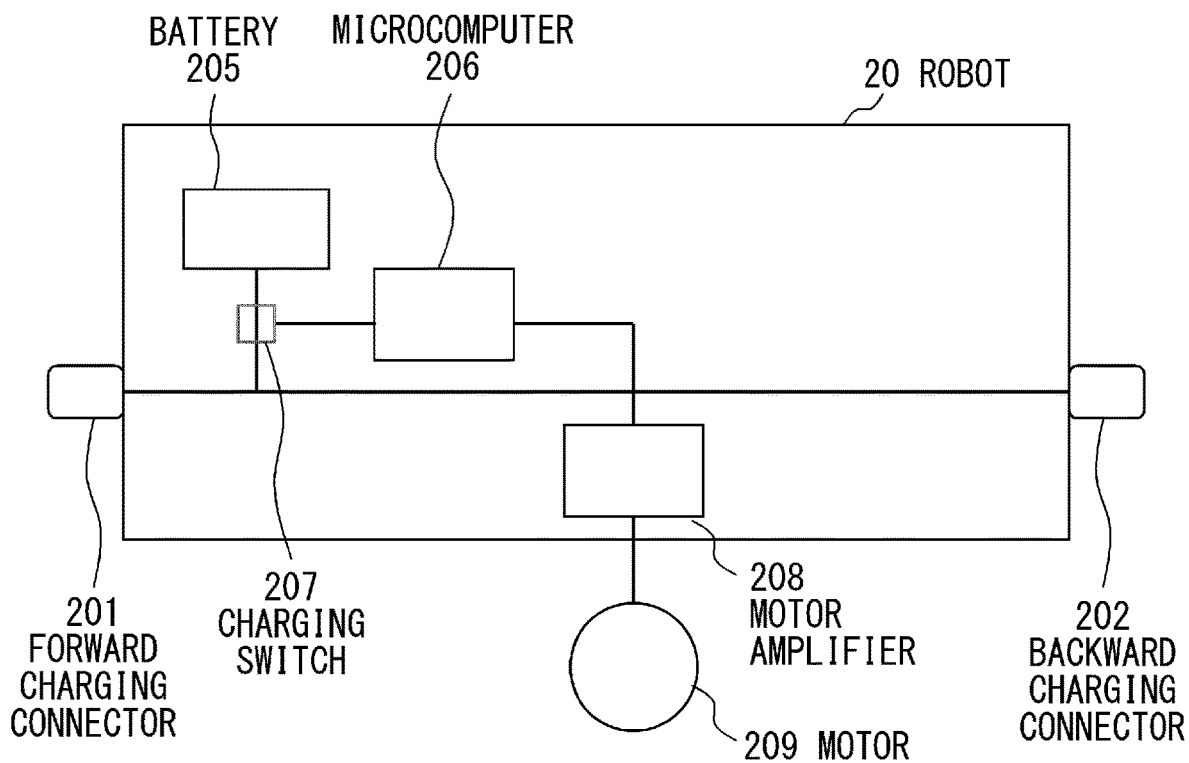
FIG. 7 is a block diagram showing one example of a block configuration of the robot according to the first embodiment.

FIG. 7 shows one example of the block configuration of the robot 20 according to the first embodiment.

The robot 20 shown in FIG. 7 includes, besides the forward charging connector 201 and the backward charging connector 202 described above, the battery 205, a microcomputer 206, a charging switch 207, a motor amplifier 208, and a motor 209.

The forward charging connector 201 and the backward charging connector 202 are electrically connected to each other via an electric wire inside the robot 20. Therefore, the power that has been supplied from the charger unit 10 directly or indirectly and has been input via the forward charging connector 201 can be output to another robot 20 via the backward charging connector 202.

The microcomputer 206 controls each of the components inside the robot 20 and executes the functions included in the robot 20. For example, when the microcomputer 206 charges the battery 205, the microcomputer 206 turns on the charging switch 207 and supplies power to the battery 205, thereby charging the battery 205. Further, when the battery 205 is not charged, the microcomputer 206 turns off the charging switch 207 and stops power supply to the battery 205. When, for example, the battery 205 has been fully charged or the electric connection with the charger unit 10 has been interrupted, the microcomputer 206 does not charge the battery 205.

The motor amplifier 208 receives power supply from the battery 205 via the microcomputer 206. The motor amplifier 208 supplies power to the motor 209 and controls driving of the motor 209. The motor 209 drives the driving wheels 203 to travel forward when it causes the robot 20 to approach the charger unit 10. Further, the motor 209 drives the driving wheels 203 to travel backward when it causes the robot 20 to be retracted from the charger unit 10.

As described above, the robot 20 can automatically travel forward and backward in response to a command from the microcomputer 206. In the first embodiment, a rail is preferably provided in the position where the robot 20 is parked, although this rail is not shown in the drawings. Further, the robot 20 is configured in such a way that, when the robot 20 travels forward or backward, the driving wheels 203 move along the rail and the forward charging connector 201 of the robot 20 is engaged with or disengaged from the charging connector 101 of the charger unit 10 or the backward charging connector 202 of another robot 20. Therefore, it is sufficient that the robot 20 be able to automatically travel forward and backward, and the driving accuracy may not be as high as the accuracy of automatic driving.

<Operations of First Embodiment>

Next, operations of the charging system according to the first embodiment will be explained.

Figure 8:
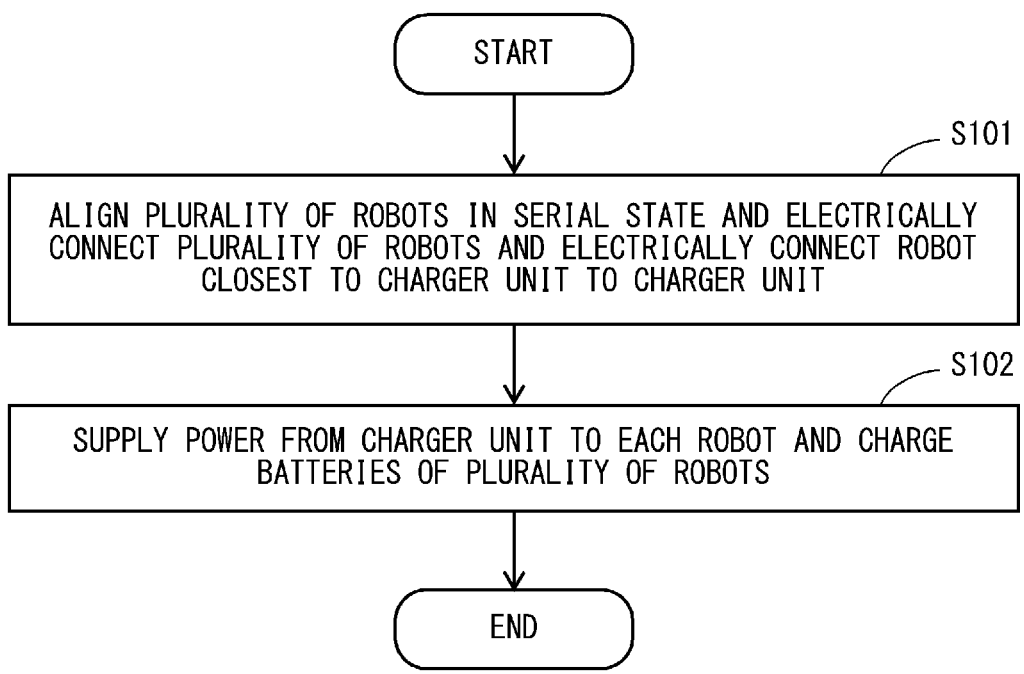
FIG. 8 is a flowchart showing one example of a charging method by the charging system according to the first embodiment.

FIG. 8 shows one example of a flow of a charging method by the charging system according to the first embodiment.

As shown in FIG. 8, first, the plurality of robots 20 are aligned in a serial state. Then the plurality of robots 20 are electrically connected to one another. Specifically, the backward charging connector 202 or the backward non-contact charging terminal 202A of one of the robots 20 that are adjacent to each other in the direction in which the robots 20 are aligned and the forward charging connector 201 or the forward non-contact charging terminal 201A of the other robot 20 are electrically connected to each other. Further, the robot 20 that is the closest to the charger unit 10 and the charger unit 10 are electrically connected to each other. Specifically, the forward charging connector 201 or the forward non-contact charging terminal 201A of the robot 20 that is the closest to the charger unit 10 and the charging connector 101 or the non-contact charging terminal 101A of the charger unit 10 are electrically connected to each other (Step S1.01).

By controlling the robot 20 in such a way that it is electrically connected to the charger unit 10 or another robot 20 which is located in front of the robot 20 when the robot 20 is parked, the state of Step S101 is achieved in advance.

After that, power is supplied from the charger unit 10 to each of the robots 20 and the batteries 205 of the plurality of robots 20 are charged (Step S102).

<Effects of First Embodiment>

As described above, according to the first embodiment, the charger unit 10 includes the charging connector 101 or the non-contact charging terminal 101A and the robot 20 includes the forward charging connector 201 and the backward charging connector 202 or the forward non-contact charging terminal 201A and the backward non-contact charging terminal 202A. When the batteries 205 of the plurality of robots 20 are charged, the plurality of robots 20 are aligned in the serial state, the plurality of robots 20 are electrically connected to one another via the connectors or the non-contact charging terminals, and the robot 20 that is the closest to the charger unit 10 is electrically connected to the charger unit 10 via the connectors or the non-contact charging terminals. Next, power is supplied from the charger unit 10 to each of the robots 20 and the batteries 205 of the plurality of robots 20 are charged.

As described above, the plurality of robots 20 are aligned in the serial state and the plurality of robots 20 are charged while they are electrically connected to one another. Therefore, the batteries 205 of the plurality of robots 20 can be collectively charged by one charger unit 10, whereby it is possible to reduce the cost for the charger unit 10. Further, since the plurality of robots 20 are aligned in the serial state while they are charged, there is no need to increase the intervals between the robots 20 or to make space for the robots 20 to pass. Therefore, it is not necessary to prepare a large parking space.

(2) Second Embodiment

As a usage form of the electric autonomous moving body such as the robot 20 according to the first embodiment, it is possible to assume a form in which many users use electric autonomous moving bodies in the form of the sharing. In the form of the sharing, there is no case in which the robot 20 needs to be charged again just after it is lent to the user if the robot 20 having a sufficient amount of charge can be lent to the user, which increases convenience for the user.

Assume a case, for example, in which the amount of power consumed in the robot 20 according to the first embodiment when it is lent once is constant. In this case, the robot 20 that has been returned earlier, that is, the robot 20 that is closer to the charger unit 10 and has been charged earlier, stores a large amount of charge.

Figure 9:
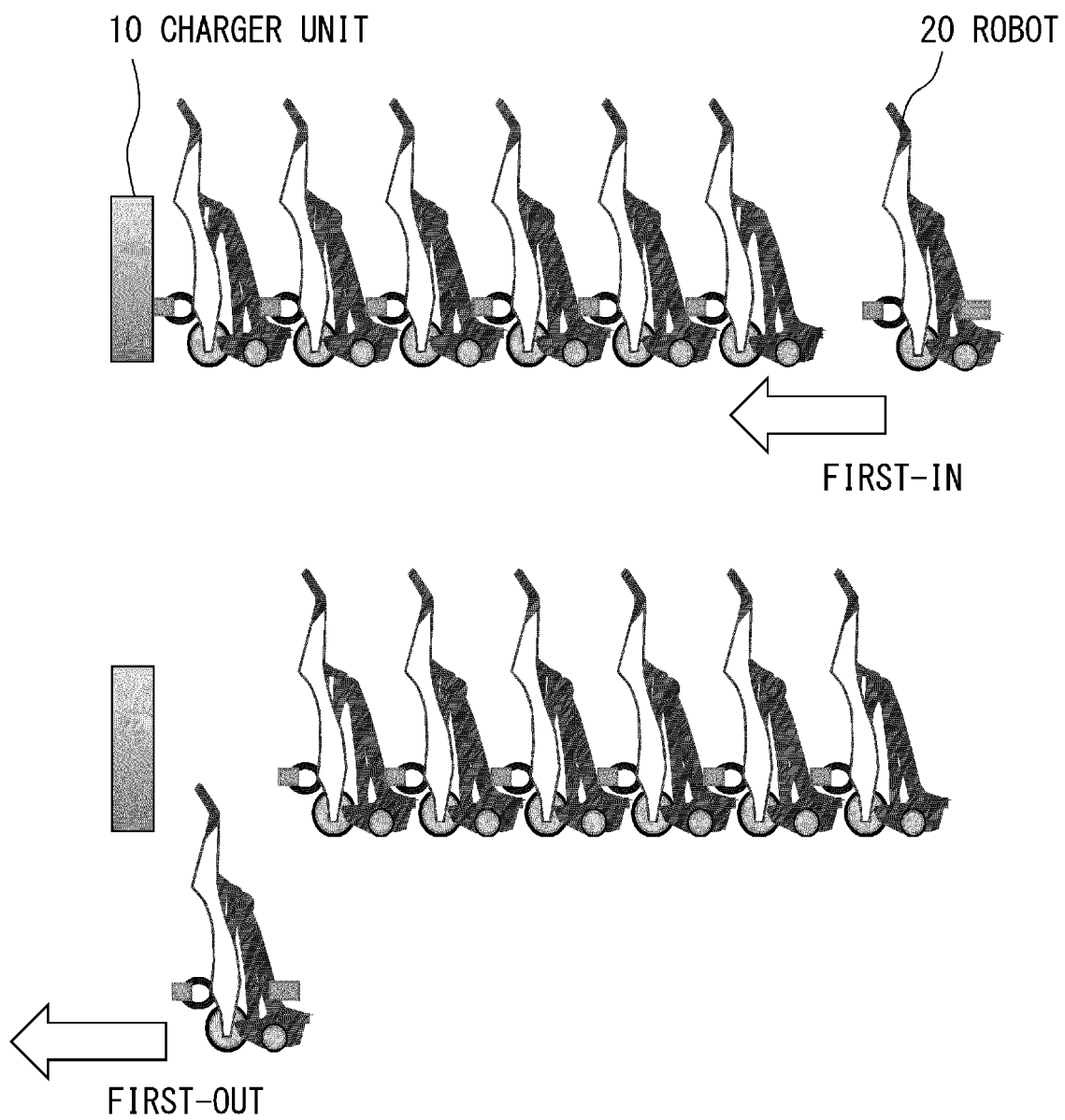
FIG. 9 is a diagram showing an image of a first-in first-out system.

Accordingly, a method of lending one of the plurality of robots 20 that has been returned first, that is, the robot 20 that is the closest to the charger unit 10 and is being charged at the forefront of the aligned robots may be employed as a method of lending the robot 20 having a sufficient amount of charge to the user. In the following description, a system in which the robot 20 that has been returned first and is being parked is released and used first is called a first-in first-out system. FIG. 9 shows an image view of the first-in first-out system.

In the first-in first-out system, the robot 20 that is the closest to the charger unit 10 and is charged at the forefront of the aligned robots is separated and is used by the user. However, since the charger unit 10 is provided in front of the robot 20 that is being charged at the forefront of the aligned robots, the robot 20 cannot travel forward. Further, since the plurality of other robots 20 are connected behind the robot 20 that is being charged at the forefront of the aligned robots, this robot 20 cannot travel backward as well unless the user moves these plurality of robots 20 by, for example, hand.

The second embodiment proposes a method of enabling the user to easily use the robot 20 that is the closest to the charger unit 10 and is charged at the forefront of the aligned robots in the first-in first-out system.

<Configuration of Second Embodiment>

In this second embodiment, the block configuration of the robot 20 is different from that of the first embodiment and the external configurations of the charger unit 10 and the robot 20 and the block configuration of the charger unit 10 are similar to those of the first embodiment.

Therefore, in the following description, only the block configuration of the robot 20 according to the second embodiment will be explained as the structure of this second embodiment. In this example, a block configuration in a case in which the charger unit 10 includes the charging connector 101 and the robot 20 includes the forward charging connector 201 and the backward charging connector 202 will be explained.

<Block Configuration of Robot According to Second Embodiment>

Figure 10:
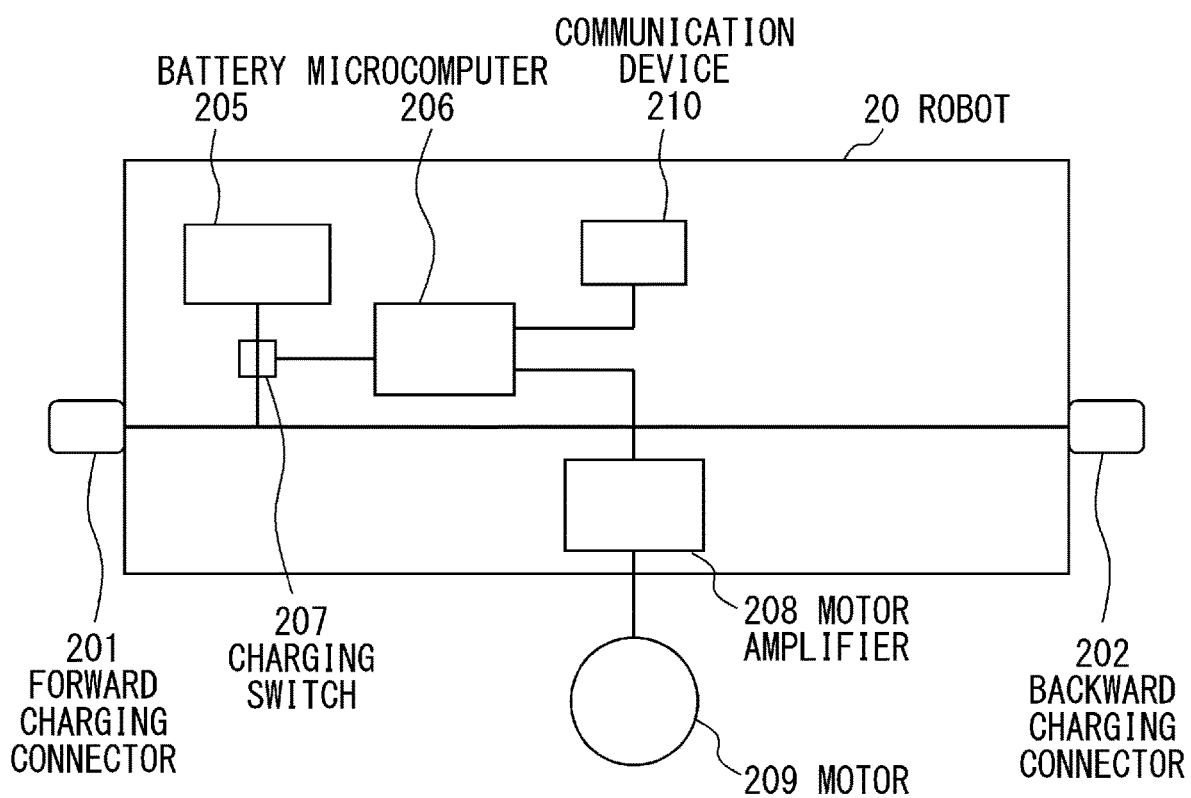
FIG. 10 is a block diagram showing on example of a block configuration of a robot according to a second embodiment.

FIG. 10 shows one example of the block configuration of the robot 20 according to the second embodiment.

The robot 20 shown in FIG. 10 is different from that in the first embodiment shown in FIG. 7 in that a communication device 210 is further added to the robot 20.

The communication device 210 performs radio communication with an external device. In the second embodiment, the communication device 210 performs radio communication with another robot 20. When the charger unit 10 includes a radio communication function, the communication device 210 may perform radio communication with the charger unit 10. The radio communication system of the communication device 210 may be wireless Local Area Network (LAN) communication or Bluetooth (registered trademark) communication, but it is not limited thereto.

<Operations of Second Embodiment>

Next, operations of a charging system according to the second embodiment will be explained.

Figure 11:
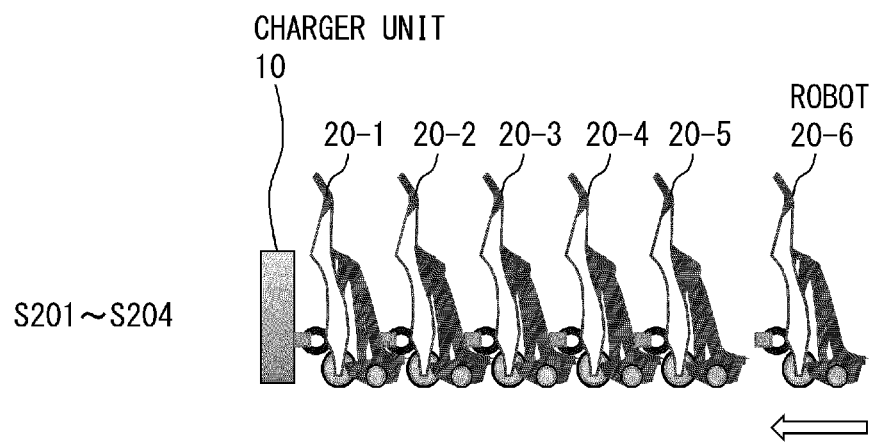
FIG. 11 is a diagram showing one example of operations when the robot is connected by a charging system according to the second embodiment.
Figure 12:
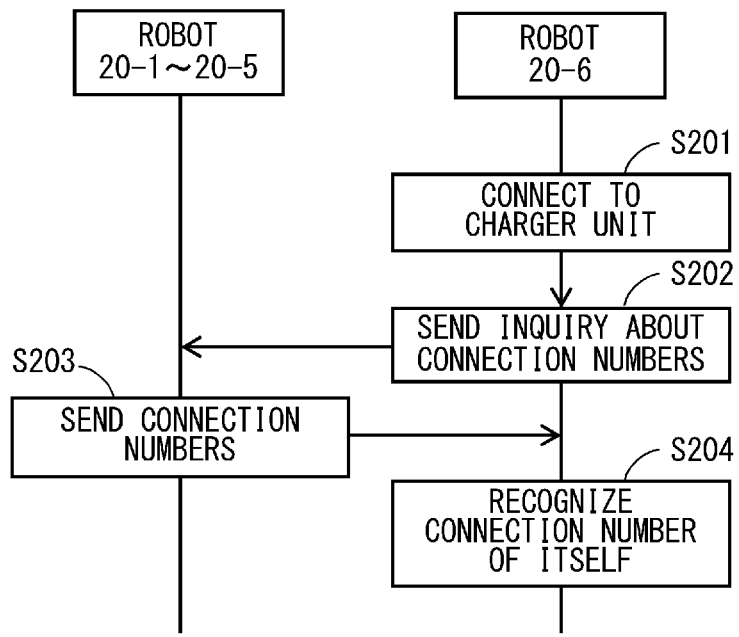
FIG. 12 is a sequence diagram showing one example of an operation sequence of the operations shown in FIG. 11.

First, FIG. 11 shows one example of the operations when the robot 20 is connected in the charging system according to the second embodiment. Further, FIG. 12 shows one example of an operation sequence of the operations shown in FIG. 11. In FIGS. 11 and 12, the same steps are denoted by the same step numbers.

It is assumed, in FIGS. 11 and 12, that the robots 20-1 to 20-5 are connected to the charger unit 10 in this order and a robot 20-6 is newly connected. Further, the robots 20-1 to 20-5 respectively recognize "1"-"5" as the connection numbers indicating the order in which they are connected to the charger unit 10.

As shown in FIGS. 11 and 12, when the robot 20-6 detects that it has electrically connected to the charger unit 10 (Step S201), the robot 20-6 sends an inquiry about the connection numbers to the other robots 20-1 to 20-5 that have already electrically connected to the charger unit 10 (Step S202).

The robots 20-1 to 20-5 send, in response to the inquiry about the connection numbers sent from the robot 20-6, the connection numbers of themselves (Step S203). In this example, the robots 20-1 to 20-5 respectively send the connection numbers "1"-"5" to the robot 20-6.

The robot 20-6 recognizes, based on the connection numbers sent from the robots 20-1 to 20-5, the connection number of the robot 20-6 (Step S204). In this example, the robot 20-6 recognizes that its connection number is "6".

In the following process, if the robot 20-1 is separated from the charger unit 10 for rental, the robots 20-2 to 20-6 update the respective connection numbers. This point will be explained later.

Figure 13:
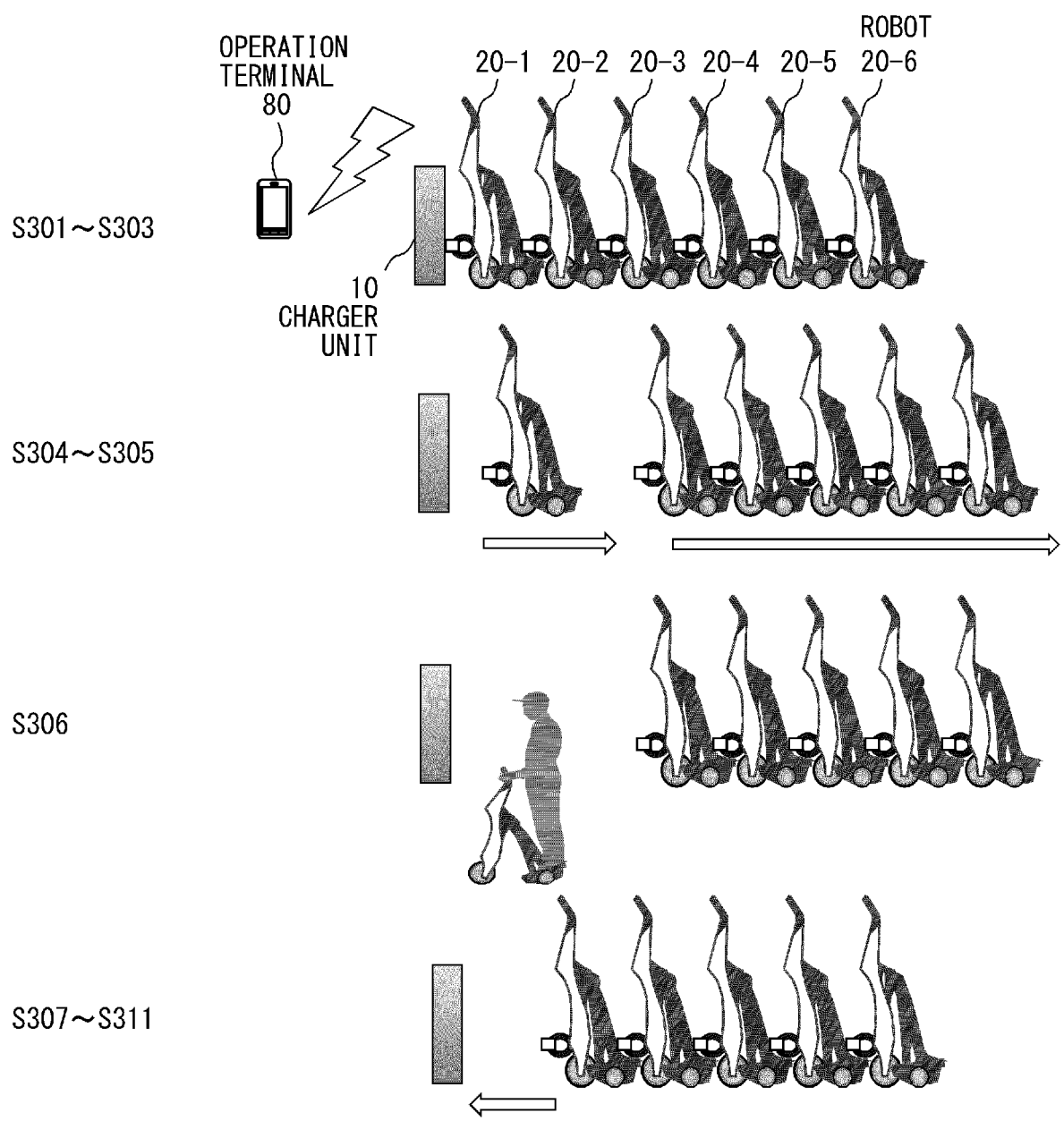
FIG. 13 is a diagram showing one example of operations when the robot is lent by the charging system according to the second embodiment.
Figure 14:
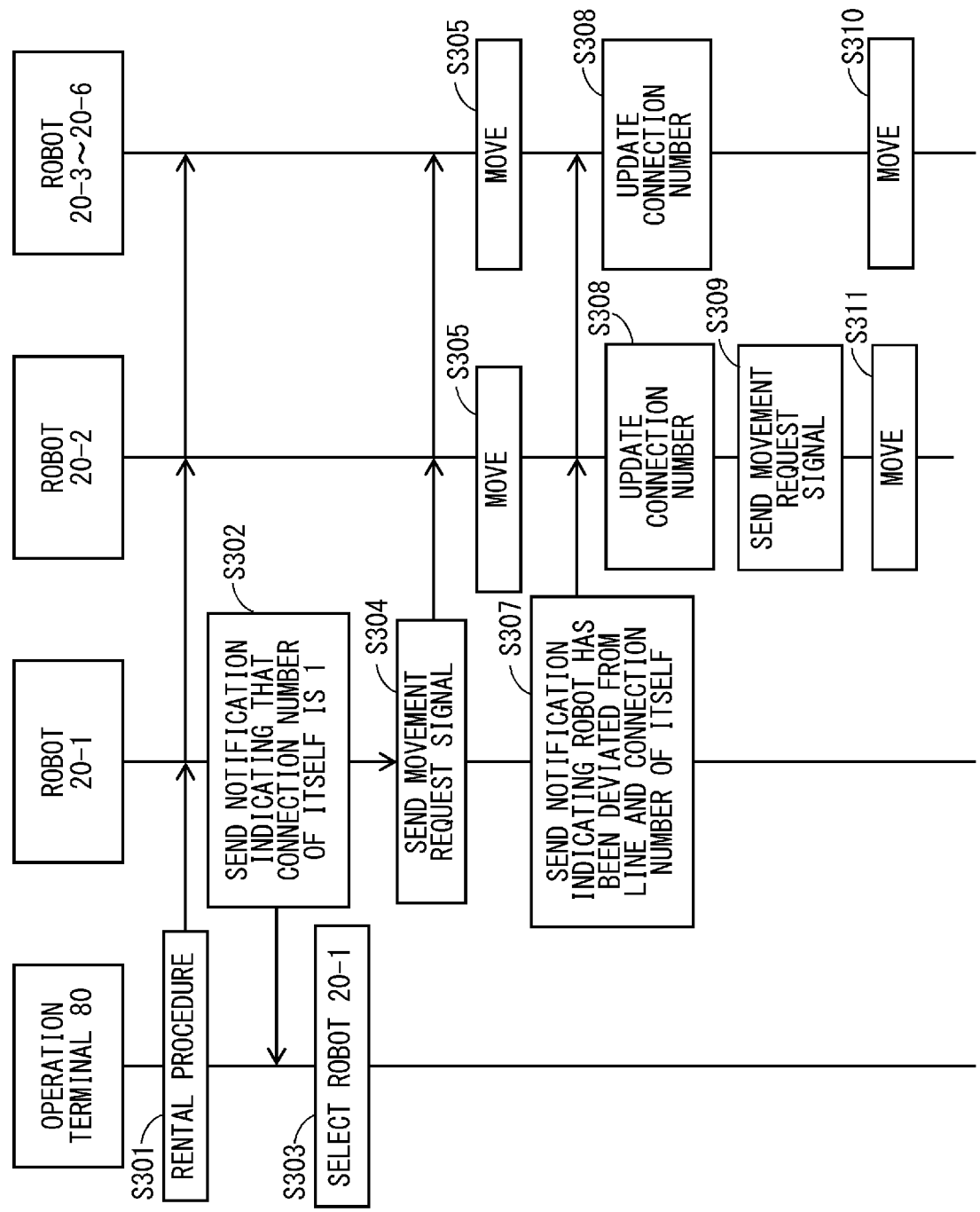
FIG. 14 is a sequence diagram showing one example of an operation sequence of the operations in FIG. 13.

Next, FIG. 13 shows one example of the operations when the robot 20 is lent in the charging system according to the second embodiment. Further, FIG. 14 shows one example of an operation sequence of the operations shown in FIG. 13. In FIGS. 13 and 14, the same steps are denoted by the same step numbers.

In FIGS. 13 and 14, it is assumed that the robots 20-1 to 20-6 are connected to the charger unit 10 in this order. It is further assumed that the robots 20-1 to 20-6 respectively recognize "1"-"6" as the respective connection numbers.

As shown in FIGS. 13 and 14, first, the user performs a procedure for renting the robot 20 using an operation terminal 80 (Step S301). Then a notification indicating that the user has performed the procedure is sent from the operation terminal 80 to the robots 20-1 to 20-6. While the operation terminal 80 is a mobile terminal such as a smartphone carried by the user in FIG. 13, this embodiment is not limited thereto. The operation terminal 80 may be, for example, an operation board or the like provided in the vicinity of the charger unit 10 or in the charger unit 10 itself.

Next, the robot 20-1 sends a notification indicating that the connection number of itself is "1" (Step S302). Upon receiving the notification from the robot 20-1, the operation terminal 80 recognizes that the robot 20-1 is the robot 20 that is the closest to the charger unit 10 and is charged at the forefront of the aligned robots, and selects the robot 20-1 as the robot 20 to be lent to the user (Step S303). Further, the operation terminal 80 notifies the user that the robot 20-1 will be lent to the user by, for example, displaying this notification on the screen. While only the robot 20-1 of the connection number "1" notifies the operation terminal 80 of the connection number in Step S302, this embodiment is not limited thereto. All the robots 20-1 to 20-6 may notify the operation terminal 80 of their connection numbers, and the operation terminal 80 may check the connection numbers of the robots 20-1 to 20-6 and select the robot 20-1 whose connection number is "1".

The following operations are performed by the robot 20 whose connection number is "1", which serves as a controller.

At this time, since the connection number of the robot 20-1 is "1", the robot 20-1 serves as a controller.

The robot 20-1, which now serves as a controller, sends a movement request signal to the other robots 20-2 to 20-6 to move backward (retract) by a predetermined movement amount (Step S304).

Next, the robots 20-2 to 20-6 are controlled to be driven to move backward by a predetermined movement amount in accordance with the movement request signal from the robot 20-1 (Step S305). Accordingly, the robots 20-2 to 20-6 are separated from the charger unit 10 and the robot 20-1, the electric connection is interrupted, and the robots 20-2 to 20-6 move to a position which enables the user to easily ride the robot 20-1 and start traveling. In this case, as shown in FIG. 13, the robot 20-1 itself may be controlled to be driven to move backward. If the robot 20-1 moves backward as well, the robot 20-1 is separated from the charger unit 10, which enables the user to ride the robot 20-1 and start traveling more easily. The amount of the movement when the robot 20-1 moves backward becomes smaller than a predetermined movement amount by which the robots 20-2 to 20-6 move backward.

In this state, the user rides the robot 20-1 and starts traveling (Step S306).

In the following steps, when the robot 20-1 detects that it has been deviated from the line in which the robots 20-1 to 20-6 have been aligned in the serial state, the robot 20-1 sends a notification indicating that the robot 20-1 has been deviated from the line and the connection number "1" of the robot 20-1 to the other robots 20-2 to 20-6 (Step S307). A method of detecting that the robot 20-1 has been deviated from the line when it has moved away from the position where there was a line by a predetermined distance or more using a Global Positioning System (GPS) function may be, for example, employed as the method of detecting that the robot 20-1 has been deviated from the line. There is also a method of detecting that the robot 20-1 has been deviated from the line when it can no longer perform near-field communication with another robot 20 using a near-field communication function. However, these methods are merely examples and this embodiment is not limited thereto.

Next, upon receiving the notification from the robot 20-1, the robots 20-2 to 20-6 update the respective connection numbers (Step S308). In this example, the robots 20-2 to 20-6 respectively update the respective connection numbers to "1"-"5".

At this time, since the connection number of the robot 20-2 becomes "1", the robot 20-2 now serves as a new controller.

The robot 20-2, which now serves as a new controller, sends a movement request signal to the other robots 20-3 to 20-6 to cause them to travel forward (approach) (Step S309).

Next, the robots 20-3 to 20-6 are controlled to be driven to move forward in accordance with the movement request signal from the robot 20-2 (Step S310). Further, the robot 20-2 itself that has sent the movement request signal is controlled to be driven to move forward (Step S311). Accordingly, the robots 20-2 to 20-6 other than the robot 20-1 that has been lent to the user are electrically connected to the charger unit 10 again.

In the following processing, after the charger unit 10 is electrically connected to the robots 20-2 to 20-6 other than the robot 20-1, the charger unit 10 re-starts charging the batteries 205 of the robots 20-2 to 20-6.

While the robot 20 whose connection number is "1" serves as a controller in FIGS. 13 and 14, this embodiment is not limited thereto. The controller may be a charger unit 10 that has a radio communication function or may be a management server (not shown) provided independently from the charger unit 10 and the robot 20. When the charger unit 10 or the management server serves as a controller, the charger unit 10 or the management server may manage the connection number of the robot 20 and send the movement request signal.

<Effects of Second Embodiment>

As described above, in the second embodiment, when the robot 20 (it is assumed that this robot is the robot 20-1) that is the closest to the charger unit 10 and is charged at the forefront of the aligned robots is separated from the charger unit 10, the movement request signal is sent from the robot 20-1. Upon receiving this movement request signal, the robots 20 other than the robot 20-1 are controlled to be driven in such a way that they are retracted from the charger unit 10 and the robot 20-1 and the electric connection is interrupted. After the robot 20-1 is separated from the charger unit 10, the robots other than the robot 20-1 are controlled to be driven to approach the charger unit 10 and electrically connected thereto again. After the charger unit 10 is electrically connected to the robots 20 other than the robot 20-1, the charger unit 10 re-starts charging the batteries 205 of the robots 20 other than the robot 20-1.

Therefore, the user is able to easily use the robot that is the closest to the charger unit 10 and is charged at the forefront of the aligned robots, that is, the robot 20 having a sufficient amount of charge, which enhances convenience for the user.

(3) Third Embodiment

A third embodiment proposes a method other than that described in the second embodiment as a method of enabling the user to easily use the robot 20 that is the closest to the charger unit 10 and is being charged at the forefront of the aligned robots in the first-in first-out system.

<Configuration of Third Embodiment>

In this third embodiment, the external configuration and the block configuration of the charger unit 10 are different from those of the second embodiment and the external configuration and the block configuration of the robot 20 are similar to those of the second embodiment.

Therefore, in the following description, as a structure of the third embodiment, only the external configuration and the block configuration of the charger unit 10 according to the third embodiment will be explained. In this example, an external configuration and a block configuration in a case in which the charger unit 10 includes the charging connector 101 and the robot 20 includes the forward charging connector 201 and the backward charging connector 202 will be explained.

<External Configuration of Charger Unit According to Third Embodiment>

Figure 15:
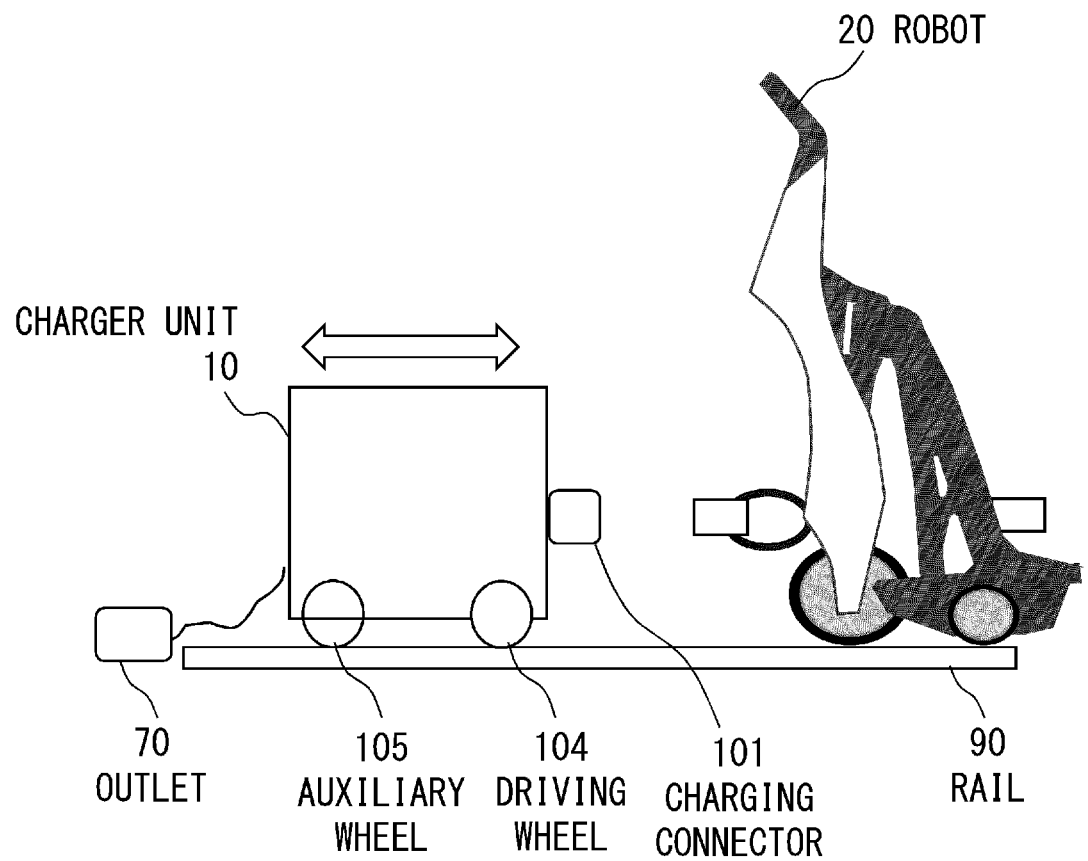
FIG. 15 is an external side view showing one example of an external configuration of a charger unit according to a third embodiment.

FIG. 15 shows one example of the external configuration of the charger unit 10 according to the third embodiment.

The charger unit 10 shown in FIG. 15 includes driving wheels 104 and an auxiliary wheel 105, and is configured to be able to approach and retract from the plurality of robots 20 that are aligned in the serial state.

In the third embodiment, a rail 90 is provided in a place where the charger unit 10 is placed. The charger unit 10 is configured in such a way that, when it approaches or retracts from a robot 20, the driving wheels 104 move along the rail 90 and the charging connector 101 of the charger unit 10 is engaged with or disengaged from the forward charging connector 201 of the robot 20. Therefore, it is sufficient that the charger unit 10 be able to automatically approach and retract from the robot 20, and the driving accuracy may not be as high as the accuracy of automatic driving.

Further, in the third embodiment, the rail 90 is extended also in the direction of the plurality of robots 20 that are aligned in the serial state. The robot 20 is configured in such a way that, when the robot 20 travels forward or backward, the driving wheels 203 move along the rail and the forward charging connector 201 of the robot 20 is engaged with or disengaged from the charging connector 101 of the charger unit 10 or the backward charging connector 202 of the other robot 20. Therefore, it is sufficient that the robot 20 be able to automatically travel forward and backward, and the driving accuracy may not be as high as the accuracy of automatic driving.

<Block Configuration of Charger Unit According to Third Embodiment>

Figure 16:
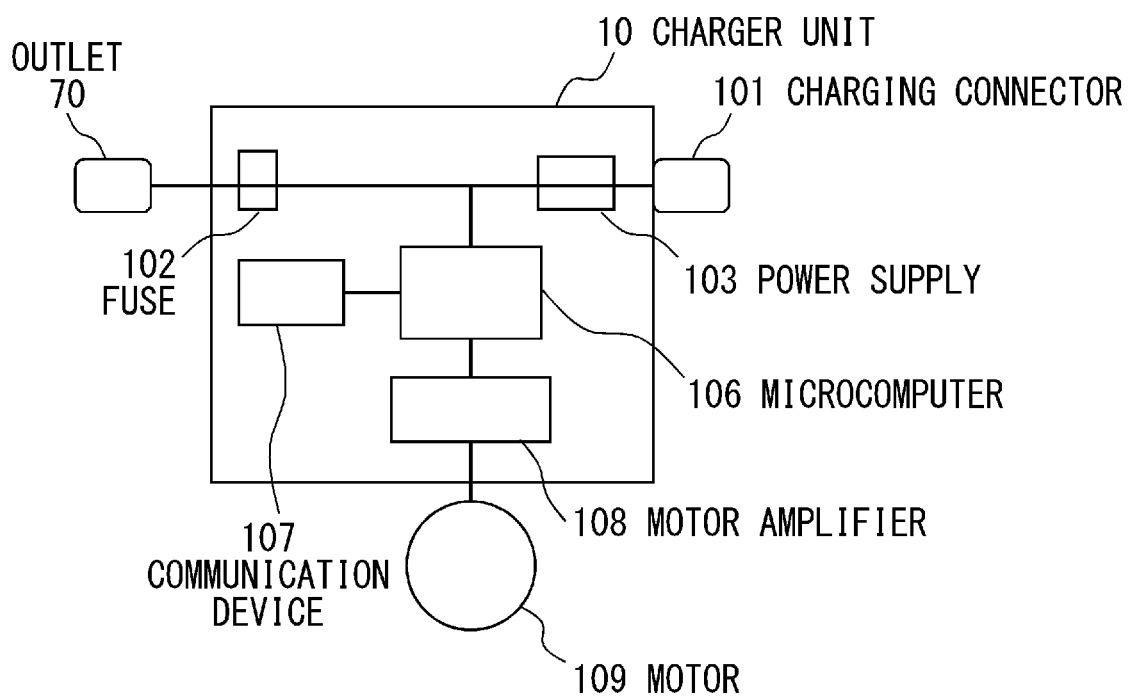
FIG. 16 is a block diagram showing one example of a block configuration of a charger unit according to the third embodiment.

FIG. 16 shows one example of a block configuration of the charger unit 10 according to the third embodiment.

The charger unit 10 shown in FIG. 16 is different from that of the first embodiment shown in FIG. 6 in that a microcomputer 106, a communication device 107, a motor amplifier 108, and a motor 109 are further added.

The microcomputer 106 controls the components inside the charger unit 10, thereby executing the functions included in the charger unit 10.

The communication device 107 performs radio communication with an external device. In the third embodiment, the communication device 107 performs radio communication with the robot 20. The radio communication system of the communication device 107 may be wireless LAN communication, Bluetooth (registered trademark) communication or the like, but is not limited thereto.

The motor amplifier 108 receives power supply from the outlet 70 via the microcomputer 106 and supplies power to the motor 109, and also controls driving of the motor 109. The motor 109 drives the driving wheels 104 to travel forward when it causes the charger unit 10 to approach the robot 20. Further, the motor 109 drives the driving wheels 104 to travel backward when it causes the charger unit 10 to be retracted from the robot 20.

<Operations of Third Embodiment>

Next, operations of a charging system according to the third embodiment will be explained.

In the third embodiment, the operations when the robot 20 is connected are similar to those in the second embodiment. Therefore, in the following description, only the operations when the robot 20 is lent will be explained.

Figure 17:
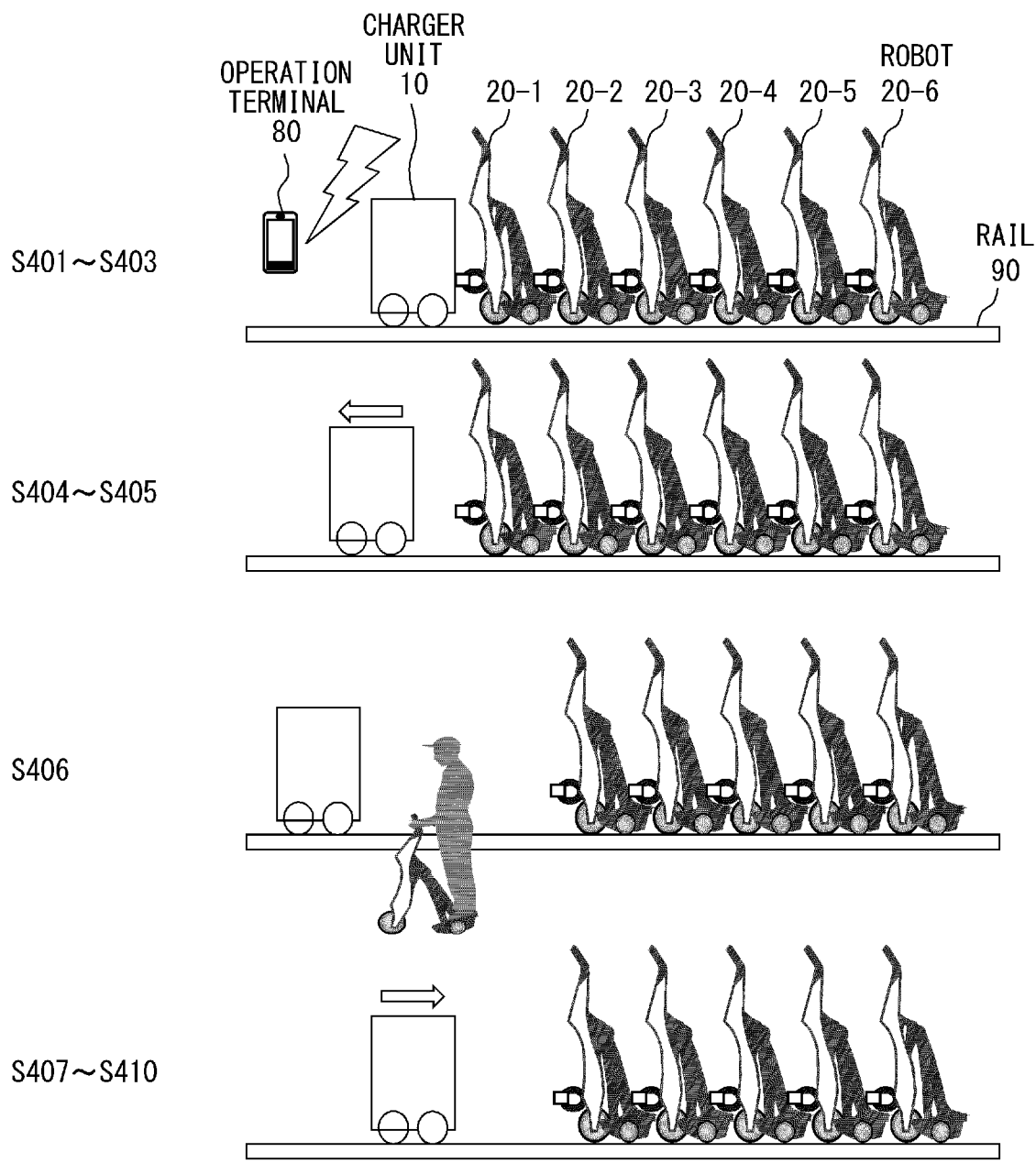
FIG. 17 is a diagram showing one example of operations when the robot is lent by a charging system according to the third embodiment.
Figure 18:
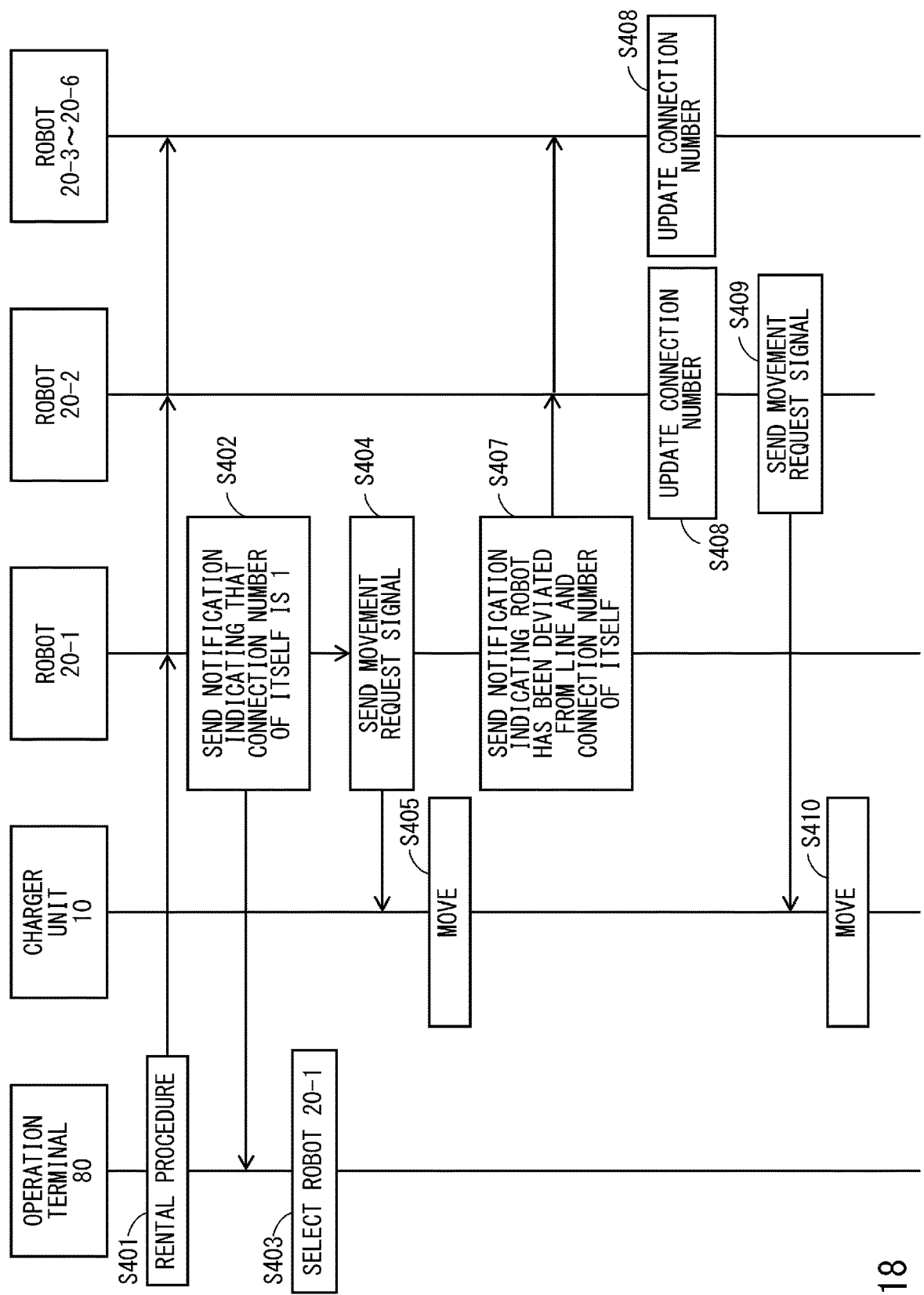
FIG. 18 is a sequence diagram showing one example of an operation sequence of the operations shown in FIG. 17.

FIG. 17 shows one example of the operations when the robot 20 is lent by the charging system according to the third embodiment. Further, FIG. 18 shows one example of an operation sequence of the operations shown in FIG. 17. In FIGS. 17 and 18, the same steps are denoted by the same step numbers.

In FIGS. 17 and 18, it is assumed that the robots 20-1 to 20-6 are connected to the charger unit 10 in this order. It is further assumed that the robots 20-1 to 20-6 respectively recognize "1"-"6" as the respective connection numbers.

As shown in FIGS. 17 and 18, first, Steps S401-S403 similar to Steps S301-S303 according to the second embodiment shown in FIG. 14 are performed.

Accordingly, the robot 20-1 is selected as the robot 20 to be lent to the user. At this timing, the robot 20-1 whose connection number is "1" serves as a controller.

The robot 20-1, which serves as a controller, sends a movement request signal to the charger unit 10 so that the charger unit 10 moves to retract from the robots 20-1 to 20-6 by a predetermined movement amount (Step S404).

Next, the charger unit 10 is controlled to be driven to retract by the predetermined movement amount in accordance with the movement request signal from the robot 20-1 (Step S405). Accordingly, the charger unit 10 is separated from the robots 20-1 to 20-6, the electric connection is interrupted, and the charger unit 10 moves to a position that enables the user to easily ride the robot 20-1 and start traveling. In this case, the robot 20-1 itself may be controlled to be driven to move forward (approach) in the direction in which the charger unit 10 moves. If the robot 20-1 moves forward as well, the robot 20-1 is separated from the robots 20-2 to 20-6, which enables the user to ride the robot 20-1 and start traveling more easily. The amount of the movement in the case in which the robot 20-1 travels forward becomes smaller than a predetermined movement amount by which the charger unit 10 is retracted.

In this state, the user rides the robot 20-1 and starts traveling (Step S406).

In the following steps, when the robot 20-1 detects that it has been deviated from the line in which the robots 20-1 to 20-6 have been aligned in the serial state, the robot 20-1 sends a notification indicating that the robot 20-1 has been deviated from the line and the connection number "1" of the robot 20-1 to the other robots 20-2 to 20-6 (Step S407). The method of detecting that the robot 20-1 has been deviated from the line is similar to the method described in Step S307 of FIG. 13.

Next, upon receiving the notification from the robot 20-1, the robots 20-2 to 20-6 update the respective connection numbers (Step S408). In this example, the robots 20-2 to 20-6 respectively update the respective connection numbers "1"-"5".

At this time, since the connection number of the robot 20-2 becomes "1", the robot 20-2 now serves as a new controller.

The robot 20-2, which now serves as a new controller, sends a movement request signal to the charger unit 10 to cause the charger unit 10 to approach the robots 20-2 to 20-6 (Step S409).

Next, the charger unit 10 is controlled to be driven to approach the robots 20-2 to 20-6 in accordance with the movement request signal from the robot 20-2 (Step S410). Accordingly, the charger unit 10 approaches the robots 20-2 to 20-6 other than the robot 20-1 that has been lent to the user, and is electrically connected to the robots 20-2 to 20-6 again.

In the following processing, after the charger unit 10 is electrically connected to the robots 20-2 to 20-6 other than the robot 20-1, the charger unit 10 re-starts charging the batteries 205 of the robots 20-2 to 20-6.

While the robot 20 whose connection number is "1" serves as a controller in FIGS. 17 and 18, this embodiment is not limited thereto. The controller may be a charger unit 10 that has a radio communication function or may be a management server (not shown) provided independently from the charger unit 10 and the robot 20. When the charger unit 10 or the management server serves as a controller, the charger unit 10 or the management server may manage the connection number of the robot 20 and send the movement request signal.

<Effects of Third Embodiment>

As described above, in the third embodiment, when the robot 20 (it is assumed that this robot is the robot 20-1) that is the closest to the charger unit 10 and is charged at the forefront of the aligned robots is separated from the charger unit 10, the movement request signal is sent from the robot 20-1. Upon receiving this movement request signal, the charger unit 10 is controlled to be driven in such a way that it is retracted from the robots 20 other than the robot 20-1 and the electric connection is interrupted. After the robot 20-1 is separated from the charger unit 10, the charger unit 10 is controlled to be driven to approach the robots 20 other than the robot 20-1 and electrically connected thereto again. After the charger unit 10 is electrically connected to the robots 20 other than the robot 20-1, the charger unit 10 re-starts charging the batteries 205 of the robots 20 other than the robot 20-1.

Therefore, the user is able to easily use the robot 20 that is the closest to the charger unit 10 and is charged at the forefront of the aligned robots, that is, the robot 20 having a sufficient amount of charge, which enhances convenience for the user.

The present disclosure is not limited to the aforementioned embodiments and may be changed as appropriate without departing from the spirit of the present disclosure.

For example, while the example in which the electric autonomous moving body is a robot (personal mobility robot) has been described in the aforementioned embodiments, the electric autonomous moving body is not limited thereto. It is sufficient that the electric autonomous moving body be an electric autonomous moving body having a battery such as other robots (a cleaning robot etc.), an electric automobile, an electric shopping cart etc.

Figure 19:
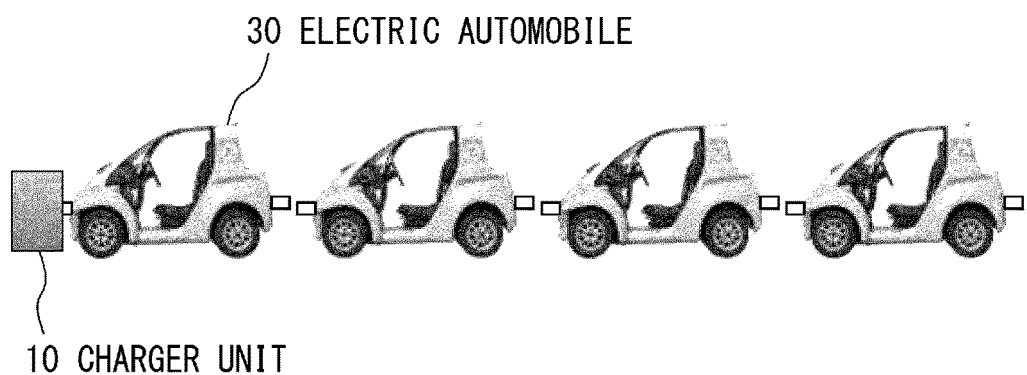
FIG. 19 is an external side view showing one example of an external configuration of a charging system according to a modified example of the first to third embodiments.
Figure 20:
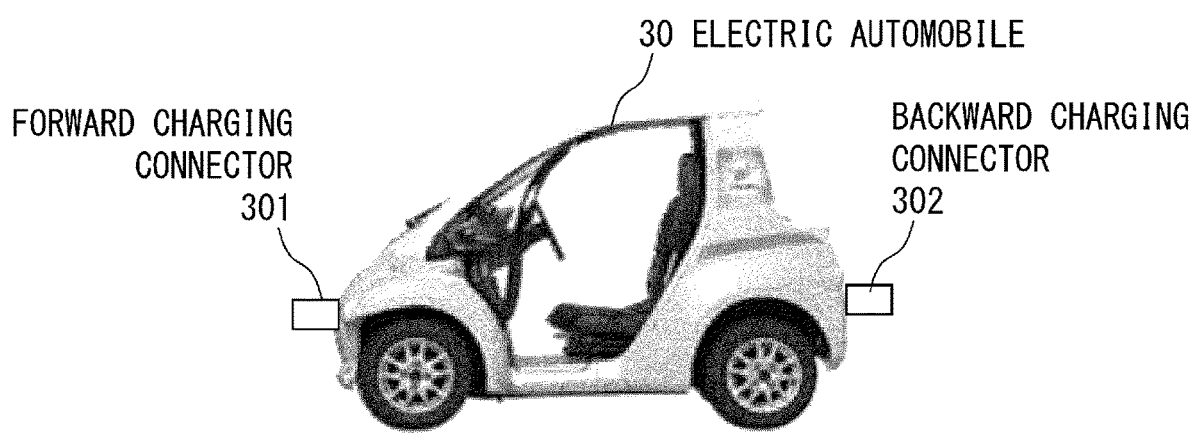
FIG. 20 is an external side view showing one example of an external configuration of an electric automobile according to the modified example of the first to third embodiments.

FIG. 19 shows one example of an external configuration of a charging system when an electric automobile is used as the electric autonomous moving body, and FIG. 20 shows one example of the external configuration of the electric automobile shown in FIG. 19.

In the charging system shown in FIGS. 19 and 20, the robot 20 is replaced by an electric automobile 30, and the electric automobile 30 includes a forward charging connector 301 and a backward charging connector 302, similar to the robot 20. Further, the electric automobile 30 may include a forward non-contact charging terminal and a backward non-contact charging terminal in place of the forward charging connector 301 and the backward charging connector 302.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method of charging batteries of a plurality of electric autonomous moving bodies, wherein one charger unit capable of charging the batteries of the plurality of electric autonomous moving bodies is prepared, connection member that can be electrically connected to the electric autonomous moving body is provided in the charger unit, each of the electric autonomous moving bodies has a communication function and is provided with a first connection member that can be electrically connected to the connection member of the charger unit and further provided with a second connection member that can be electrically connected to the first connection member of another one of the electric autonomous moving bodies in a position that is opposite to the body of the electric autonomous moving body with respect to the first connection member in a direction in which the electric autonomous moving bodies are aligned in a serial state, the plurality of electric autonomous moving bodies are aligned in the serial state, the second connection member of one of the electric autonomous moving bodies that are adjacent to each other in the direction in which the electric autonomous moving bodies are aligned and the first connection member of the other one of the electric autonomous moving bodies that are adjacent to each other are electrically connected to each other, and the first connection member of the electric autonomous moving body that is the closest to the charger unit and the connection member of the charger unit are electrically connected to each other and power is supplied from the charger unit to each of the electric autonomous moving bodies, thereby charging the batteries of the plurality of electric autonomous moving bodies; and upon receiving a request signal sent when a first electric autonomous moving body, which is the foremost electric autonomous moving body of the aligned electric autonomous moving bodies that is being charged by the charger unit, is separated from the charger unit, an electric autonomous moving body other than the first electric autonomous moving body is controlled to be driven to retract from the charger unit and the first electric autonomous moving body so that the electric connection between them is interrupted, after the first electric autonomous moving body is separated from the charger unit, the electric autonomous moving body other than the first electric autonomous moving body is controlled to be driven to come close to the charger unit and to be electrically connected again, and after the charger unit is electrically connected to the electric autonomous moving body other than the first electric autonomous moving body, the charger unit re-starts charging the battery of the electric autonomous moving body other than the first electric autonomous moving body.

2. The method of charging the electric autonomous moving bodies according to claim 1, wherein each of the connection member, the first connection member, and the second connection member is a charging connector or a non-contact charging terminal.

3. A method of charging batteries of a plurality of electric autonomous moving bodies, wherein one charger unit capable of charging the batteries of the plurality of electric autonomous moving bodies is prepared, the charger unit being configured to be able to approach and retract from the plurality of electric autonomous moving bodies aligned in the serial state and further including a communication function, connection member that can be electrically connected to the electric autonomous moving body is provided in the charger unit, each of the electric autonomous moving bodies is provided with a first connection member that can be electrically connected to the connection member of the charger unit and further provided with a second connection member that can be electrically connected to the first connection member of another one of the electric autonomous moving bodies in a position that is opposite to the body of the electric autonomous moving body with respect to the first connection member in a direction in which the electric autonomous moving bodies are aligned in a serial state, the plurality of electric autonomous moving bodies are aligned in the serial state, the second connection member of one of the electric autonomous moving bodies that are adjacent to each other in the direction in which the electric autonomous moving bodies are aligned and the first connection member of the other one of the electric autonomous moving bodies that are adjacent to each other are electrically connected to each other, and the first connection member of the electric autonomous moving body that is the closest to the charger unit and the connection member of the charger unit are electrically connected to each other and power is supplied from the charger unit to each of the electric autonomous moving bodies, thereby charging the batteries of the plurality of electric autonomous moving bodies, and upon receiving a request signal sent when a first electric autonomous moving body, which is a foremost electric autonomous moving body of the aligned electric autonomous moving bodies that is being charged by the charger unit, is separated from the charger unit, the charger unit is controlled to be driven to retract from the plurality of electric autonomous moving bodies so that the electric connection between them is interrupted, after the first electric autonomous moving body is separated from the charger unit, the charger unit is controlled to be driven to approach an electric autonomous moving body other than the first electric autonomous moving body and to be electrically connected thereto, and after the charger unit is electrically connected to the electric autonomous moving body other than the first electric autonomous moving body, the charger unit re-starts charging the battery of the electric autonomous moving body other than the first electric autonomous moving body.

4. The method of charging the electric autonomous moving bodies according to claim 3, wherein each of the connection member, the first connection member, and the second connection member is a charging connector or a non-contact charging terminal.

* * * * *

UNITED STATES PATENT AND TRADEMARK OFFICE
CERTIFICATE OF CORRECTION

PATENT NO. : 10,875,415 B2  
APPLICATION NO. : 16/234828  
DATED : December 29, 2020  
INVENTOR(S) : Masayuki Itoh Page 1 of 1

It is certified that error appears in the above-identified patent and that said Letters Patent is hereby corrected as shown below:

On the Title Page

Item (71), applicant, city, delete "Toyota" and insert --Toyota-shi Aichi-ken--, therefor.

Item (72), inventor, city, delete "Nagoya" and insert --Nagoya-shi Aichi-ken--, therefor.

Item (73), assignee, city, delete "Toyota" and insert --Toyota-shi Aichi-ken--, therefor.

In the Specification

In Column 7, Line(s) 5, delete "(Step S1.01)." and insert --(Step S101).--, therefor.

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*